United States Patent
Cohen et al.

(10) Patent No.: US 6,389,462 B1
(45) Date of Patent: May 14, 2002

(54) METHOD AND APPARATUS FOR TRANSPARENTLY DIRECTING REQUESTS FOR WEB OBJECTS TO PROXY CACHES

(75) Inventors: Ariel Cohen, Berkeley Heights; Sampath Rangarajan, Bridgewater; Navjot Singh, Morristown, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/212,980

(22) Filed: Dec. 16, 1998

(51) Int. Cl.[7] ............................................. G06F 15/16
(52) U.S. Cl. ..................... 709/218; 709/201; 709/203; 709/219; 709/229; 709/231; 709/239; 707/10; 707/501
(58) Field of Search ................................. 709/218, 203, 709/219, 201, 224, 229, 239, 231; 707/10, 501; 713/201

(56) References Cited

U.S. PATENT DOCUMENTS

| | | | |
|---|---|---|---|
| 5,774,660 A | * 6/1998 | Brendel et al. | 709/201 |
| 5,838,916 A | * 11/1998 | Domenikos et al. | 709/219 |
| 5,864,852 A | * 1/1999 | Luotonen | 707/10 |
| 5,905,872 A | * 5/1999 | DeSimone et al. | 709/245 |
| 5,941,954 A | * 8/1999 | Kalajan | 709/239 |

(List continued on next page.)

OTHER PUBLICATIONS

ACEdirector 2 Data Sheet, ACElerate Layer 4 Services, Server Switching Services, http;//www.alteon.com.
"Deploying Transparent Caching With Inktomi's Traffic Server", http://www.inktomi.com.
Danzig, Peter, Network Appliance, Inc., "NetCache Architecture and Deployment", http://www.network application.com.

(List continued on next page.)

*Primary Examiner*—Ayaz Sheikh
*Assistant Examiner*—Frantz B. Jean
(74) *Attorney, Agent, or Firm*—Stephen M. Gurey

(57) ABSTRACT

In order to transparently redirect an HTTP connection request that is directed to an origin server (107) to a proxy cache (110-1), a proxy redirector (104) translates the destination address of packets directed to the origin server to the address of the proxy. During a handshaking procedure, a TCP connection is transparently established between the client (110-1) and the proxy cache. When the client transmits a GET request to what it thinks is the origin server, which request specifies the complete address of an object at that origin server that it wants a copy of, the proxy redirector modifies the complete address specified in that GET request before it is sent to the proxy cache. Specifically, the IP address of the origin server found in the destination field in the IP header of the one or more packets from the client containing the GET request is added by the proxy redirector as a prefix to the complete URL in the GET request to form an absolute URL. The proxy cache determines from that absolute URL whether it has the requested object stored in its cache. If it does, it sends the object back to the proxy redirector, which masquerades those packets as coming from the origin server by translating their destination address to the address of the client and their source address to that of the origin server. If the proxy does not have the requested object, a separate TCP connection is established between the proxy and the origin server from where the object is retrieved and then forwarded over the TCP connection between the client and the proxy. In order to account for the additional number of bytes in the GET request, an acknowledgement sequence number in packets returned from the proxy that logically follow receipt of the GET request are decremented by that number by the proxy redirector before being forwarded to the client. Similarly, a sequence number in packets transmitted by the client subsequent to the GET request are incremented by that number before being forwarded by the proxy redirector to the proxy cache.

55 Claims, 4 Drawing Sheets

U.S. PATENT DOCUMENTS

| | | | | |
|---|---|---|---|---|
| 5,987,523 A | * | 11/1999 | Hind et al. | 709/245 |
| 6,065,058 A | * | 5/2000 | Hailpern et al. | 709/231 |
| 6,081,829 A | * | 6/2000 | Sidana | 709/203 |
| 6,081,900 A | * | 6/2000 | Subramaniam et al. | 713/201 |
| 6,098,108 A | * | 8/2000 | Sridhar et al. | 709/239 |
| 6,112,212 A | * | 8/2000 | Heitler | 707/501 |
| 6,138,162 A | * | 10/2000 | Pistriotto et al. | 709/229 |
| 6,189,030 B1 | * | 2/2001 | Kirsch et al. | 709/224 |

OTHER PUBLICATIONS

"High–Performance Web Caching White Paper", Cache-Flow, Document Center, http://www.cacheflow.com.

"Shared Network Caching and Cisco'Cache Engine", http://www.cisco.com.

"The Content Smart Internet", ArrowPoint, ArrowPoint Communications, 235 Littleton Road, Westford, MA 01886, http://www.arrowpoint.com.

Danzig, P. and Swartz, K. L., "Transparent, Scalable, Fail–Safe Web Caching", Network Appliance, Inc., http://www.networkappliance.com.

RND Networks Inc., "Cache Directing Technology—White Paper", http://www.rndnetworks.com.

Foundry Products, "ServerIron Server Load Balancing and Transparent Caching Swithch", http://www.foundrynet.com.

* cited by examiner

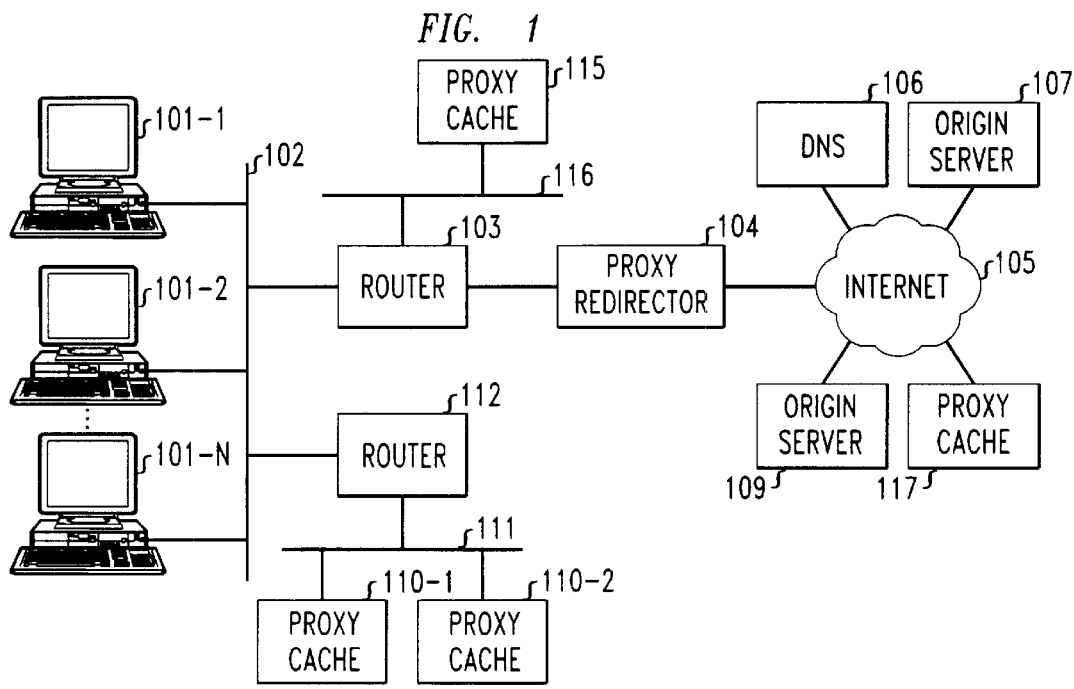
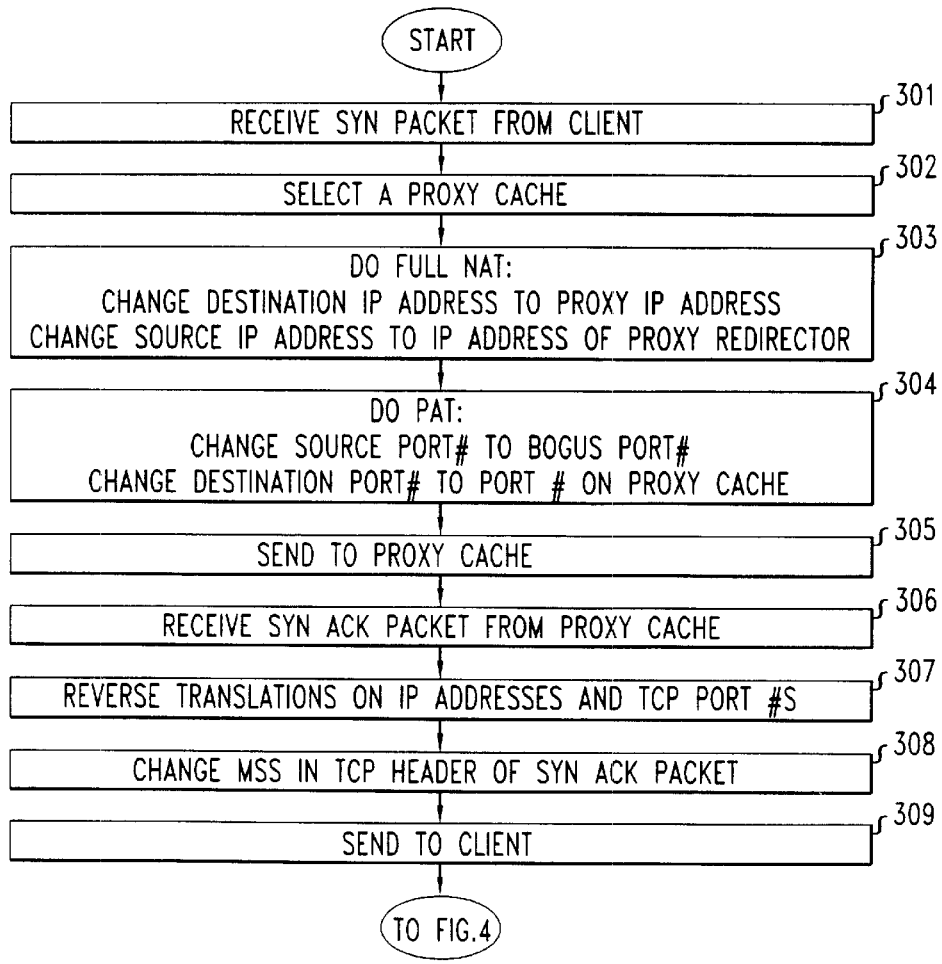

METHOD AND APPARATUS FOR TRANSPARENTLY DIRECTING REQUESTS FOR WEB OBJECTS TO PROXY CACHES

FIELD OF THE INVENTION

This invention relates to packet-switched computer networks, and more particularly, to a method and apparatus in such a network for transparently intercepting client web requests and redirecting them to proxy caches.

BACKGROUND OF THE INVENTION

Proxy caching is currently used to decrease both the latency of object retrieval and traffic on the Internet backbone. As is well known, if a proxy cache has stored a copy of an object from an origin server that has been requested by a client, the requested object is supplied to the client from the proxy cache rather than from the origin server. This, therefore, obviates the need to send the request over a wide area network, such as the Internet, to the origin server where the original object is stored and the responsive transmission of a copy of the requested object back over the network to the requesting client.

Direction of a request from a client to a proxy cache to determine whether a requested copy of an object is stored in the cache can be accomplished either transparently or non-transparently to the client. Non-transparent redirection is accomplished through the client's browser program which is configured to send all object requests to a designated proxy cache at a specified address. Generally, a browser can be configured to send all of its client requests to a designated proxy cache if the client is connected on a Local Area Network (LAN), or on an Intranet behind a firewall, where a proxy cache associated with that LAN or Intranet is located. When clients are served by a large Internet Service Provider (ISP), however, it is not advantageous from the ISP's standpoint to allow its subscribers to set their browsers to a specific proxy cache associated with the ISP. A large ISP likely will have many proxy caches in several locations and will thus want to maintain control over which of its several particular proxy caches a client request is directed. Further, if a proxy cache whose address is statically set in a client's browser becomes inoperative, all client requests will fail.

It is therefore more desirable from an ISP's standpoint with respect to latency and minimizing traffic onto and off of the network to transparently intercept a client's web request and send it to one of its operative proxy caches to determine whether a copy of the requested object is stored there. If a copy of the requested object is then found to be stored in that proxy cache, a copy of the object is sent to the client, which is unaware that it has been served an object from the proxy cache rather than from the origin server to which it made the request. If the proxy cache does not hold a copy of the requested object, then a separate connection is established between the proxy cache and the origin server to obtain a copy of the object, which when returned to the proxy is sent to the client over the connection established between the client and the proxy.

When a client specifies a URL of the object it is requesting a copy of, a Domain Name Server (DNS) look-up is performed to determine from the URL an IP address of an origin server which has that requested object. As a result of that look-up, an IP address is returned to the client of one of what may be several substantially equivalent servers that contain that object. The client then establishes a TCP connection to that server using a three-way handshake mechanism. Such a connection is determined at each end by a port number and an IP address. First, a SYN packet is sent from the client to that origin server, wherein the destination IP address specified in the packet is the DNS-determined IP address of the origin server and the destination port number for an HTTP request is conventionally port 80. The source IP address and port number of the packet are the IP address and port number associated with the client. The client IP address is generally assigned to the client by an ISP and the client port number is dynamically assigned by the protocol stack in the client. The origin server then responds back to the client with an ACK SYN packet in which the destination IP address and destination port are the client's IP address and port number and the packet's source IP address and port number are the server's IP address and the server's port number, the latter generally being port 80. After receipt of the ACK SYN packet, the client sends one or more packets to the origin server, which packets include a GET request. The GET request includes a complete URL, which identifies to that server the specific object within the origin server site that the client wants a copy of. Unlike an absolute URL, which includes both site information (e.g., www.yahoo.com), and object information (e.g., index.html), a complete URL only identifies the particular object (e.g., index.html) that is requested since the packet(s) containing the GET request is sent to the proper origin server site by means of the destination address of the packet(s).

When a browser is configured to non-transparently send all requests to a proxy, a GET request is formulated by the browser that includes the absolute URL of the requested object. That absolute URL is then used by the proxy to establish a separate TCP connection to the origin server if the proxy does not have a copy of the requested object in its cache. The proxy requires the absolute URL since the destination address of the packets to the proxy is set by the browser to the IP address of the proxy rather than the IP address of the origin server. Thus, in order to determine whether it has the object in its cache and if not establish a connection to the origin server, the proxy requires the absolute URL of the origin server in the GET request.

When requests are transparently directed to a proxy cache, however, the client browser is unaware that the request is being directed to the proxy and is possibly being fulfilled from the cache. Rather, the client's browser needs to "think" that it is connected to the origin server to which its SYN and the packet(s) containing the GET request are addressed. Such origin server IP address is determined by the browser through a. DNS look-up. Further, the source address of the ACK SYN packet and the packets containing the requested object must be that same origin server IP address or they will not be recognized by the browser as being the responsive packets to the SYN packet and the request for the object. Thus, in order to transparently send object requests to a proxy cache, a mechanism must be in place along the packet transmission path to intercept an initial SYN packet sent by a browser and to redirect it to the proxy cache to establish a TCP connection. The proxy cache must then masquerade as the origin server when sending the ACK SYN packet back to the client by using the origin server's IP address and port number as the source address of that packet. Further, the subsequent packet(s) containing a GET request must be redirected to the proxy cache and the request fulfilled either from the cache or via a separate TCP connection from the proxy to the origin server. In either case, the source address of packets sent back to the client must be the origin server's IP address and port number to which the packets sent by the client are addressed.

In order for packets associated with a request for an object to be redirected to a proxy cache connected somewhere in the network, a Layer 4 (L4) switch on the packet path "looks" at the port number of a destination address of a SYN request packet. Since HTTP connection requests are generally directed to port 80 of an origin server, the L4 switch transparently redirects all packets having a port number of 80 in the destination address. The SYN packet is thus sent to a selected proxy cache. In order for the proxy cache to properly respond to the client, as noted, it must know the absolute URL of the requested object and packets returned to the client must masquerade as coming from the origin server. Unlike the non-transparent caching method previously described in which the browser formulates a GET request with the absolute URL, for transparent caching the absolute URL must be provided in some manner to the proxy cache in order for the proxy to determine whether it in fact has the requested object in its cache, or whether it must establish a separate TCP connection to the origin server to request the object. In the prior art, when one or more caches are directly connected to the L4 switch, the switch chooses one of the caches and transparently forwards the packets to that proxy without modifying the source or destination address of the packets. The proxy, working in a promiscuous TCP mode accepts all incoming packets regardless of their destination address. The proxy, then receiving the SYN packet with the origin server's destination address and the client's source address, can respond to SYN packet with an ACK SYN packet. This ACK SYN packet has the client's address as a destination address and a source address masquerading as the origin server address. This packet is transported through the L4 switch onto the network over the TCP connection back to the client. The subsequent packet(s) with the GET request from the client is redirected by the L4 switch to the directly connected proxy. Since the GET packet(s) only contains the complete URL, the proxy must formulate the absolute URL to determine whether its has the requested object in its cache or whether is must establish a separate TCP connection to the origin server. The proxy forms the absolute URL by prefixing the complete URL in the GET request with the IP address of the origin server in the destination address of the packet. The proxy can then determine whether it has the object and, if not, establish a TCP connection to that absolute address. If that particular origin server at that IP address should be inoperative, the proxy can alternatively prefix the complete URL in the GET request with the logical name of the site indicated in the HOST field in the packet(s) containing the GET request.

In the prior art, if the proxy cache is not directly connected to the L4 switch, then the L4 switch must perform a network address translation (NAT) and port address translation (PAT) on those packets directed to port 80 of an origin server. Specifically, when the L4 switch receives a SYN packet to initiate a TCP connection from a client to an origin server, it translates the destination address of the packet from the IP address and port number of the origin server to the IP address and port number of a selected proxy cache. Further, the switch translates the source address of the packet from the clients IP address and port number to its own IP address and a port number. When the proxy responds with an ACK SYN packet, it therefore responds to the L4 switch where a NAT translates the destination IP address from the IP address of the L4 switch to the IP address of the client, and translates the source IP address from the IP address of the proxy to IP address of the origin server. A PAT also translates the port number in the destination address from that of the L4 switch to that of the client, and translates the port number in the source address from that of the proxy to that of the origin server (usually 80). When the client sends an ACK packet and then the packet(s) containing the GET request to the origin server, the L4 switch again performs a NAT, translating the destination IP address to the IP address of the proxy. Thus, when the packet(s) containing the GET request is received by the proxy, it does not know the IP address of the origin server as in the directly connected proxy arrangement described above. The proxy must therefore look at the logical name in the HOST field and perform a DNS look-up to determine that site's IP address. The proxy then uses that IP address in combination with the complete URL in the GET request to form an absolute URL from which it determines whether it has the requested object in its cache. If it doesn't, a separate TCP connection is established from the proxy to that absolute URL to retrieve that object, which is returned to the proxy. Whether the object is found in the proxy cache or is retrieved over the separate connection from the origin server, it is forwarded back to the L4 switch where a NAT and PAT are performed to translate the destination address to that of the client and to translate the source address to the particular origin server to which the client's request was directed. It should be noted that the source address of the origin server obtained when the client's browser initiates a DNS look-up using the origin server's absolute URL may not be the same IP address obtained when the proxy performs a DNS look-up using the combination of the site URL in the HOST field and the complete URL in the GET request.

The above described techniques for performing transparent proxy caching have several disadvantages. Firstly, use of a HOST field to specify a logical name of an origin server is not currently incorporated within the presently employed HTTP1.0 standards. Thus, a HOST field may not be present in the packet(s) containing a GET request. Where, as described above, the information in the HOST field is necessary to form an absolute URL to determine whether the proxy cache has the requested object and, if not, to establish a connection to an origin server from the proxy, the absence of the HOST field results in an unfilled request. Secondly, the prior art techniques require the proxy cache to perform the function of forming an absolute URL from the information in the HOST field and in the packet(s) containing the GET request. Thus, standard proxy caches which expect the client's browser to produce the absolute URL cannot be used. A methodology for transparent proxy caching that is transparent to both the client and the proxy is desirable to avoid modification to the program that controls proxy cache operations. Standard proxy caches could thus be employed anywhere in the network without the need for a special implementation.

The above described prior art techniques have even further disadvantages with respect to persistent connections defined by the HTTP1.1 standards. As defined by these standards, a persistent connection enables a client to send plural GET requests over the same TCP connection once that connection has been established between two endpoints. When a prior art transparent proxy cache is interposed on the connection, a client may "think" it has established a persistent connection to the specific origin server determined through the DNS look-up. The connection in reality, however, is transparently diverted by the L4 switch to a proxy cache. The proxy cache, in response to a DNS look-up using the logical name in the HOST field, may be directed to an equivalent origin server at a different IP address. Further, as each subsequent GET request is received by the proxy from the client within the client's perceived persistent connection, each responsive DNS look-up to the logical name may direct a connection to an even different IP address of an equivalent origin server. As a result, the advantages of a transaction-oriented persistent connection in which a server is capable of maintaining state information throughout the connection, are lost. A methodology is desirable that maintains persistence to the same origin server to which the clients browser is directed, or to a same equivalent origin server throughout the duration of the persistent connection.

SUMMARY OF THE INVENTION

The problems associated with the prior art techniques for transparent proxy caching are eliminated by the present invention. In accordance with the present invention, a switching entity, such as the L4 switch (referred to hereinafter as a proxy redirector), through which the packets flow, is provided with the functionalities at the IP level necessary to transform the complete URL in each GET request transmitted by a client to an appropriate absolute URL. Specifically, the IP address found in the destination field in the IP header of the packet(s) from the client containing the GET request are added as a prefix by the proxy redirector to the complete URL in the GET request. As a result, the complete URL in the GET request is modified to form an absolute URL which, when received by the proxy cache, is directly used to determine if the requested object is stored in the cache and, if not, to establish a separate TCP connection to the origin server. The GET request received by the proxy is thus equivalent to what it would expect to receive if it were operating in the non-transparent mode. Advantageously, if a persistent connection is established, each subsequent GET request has the same IP address prefix determined by the initial DNS look-up by the client.

By modifying the GET request at the proxy redirector to include the destination address of the origin server, the number of bytes at the IP level in the packet containing the resultant absolute address are increased by the number of bytes in the prefix. Included in the header within each packet is a sequence number (seq) that provides an indication of the position of the first byte number in the payload. Thus, when the IP address is added to a packet, the sequence number of each of the subsequent packets needs to be incremented by the count of the added bytes. Further, an acknowledgement sequence number (ack_seq) in the header on the packets returned from the proxy or the origin server that logically follow receipt of the GET packet(s) at the origin server needs to be decremented by the proxy redirector before being forwarded to the client to avoid confusing the client with respect to what the sequence number of the next byte it sends should be. Further, if the GET request sent by the client encompasses more than one TCP segment, then the extra bytes in the first of the segments caused by the additional bytes added to the URL are shifted into the second segment, and the resultant now extra bytes in the second segment are shifted into the third segment, etc., until the last of the segments. In order to preclude the necessity of requiring an extra segment to be added to the GET request to accommodate the extra bytes, the client sending the GET request, is deceived into sending segments whose maximum size is less than what can actually be received by the proxy as indicated by a maximum segment size (MSS) field in packets from the proxy. The proxy redirector, upon receipt of the On, ACK SYN packet from the proxy, reduces the MSS parameter received from the proxy by the amount of the number of bytes that will be added to the GET request before that parameter is forwarded to the client. Thus, when the client next sends a GET request, each segment is limited to the reduced MSS, thereby insuring that the segment size of a last segment in a GET request after the IP address is prefixed by the proxy redirector to form the absolute URL (whether the GET request is one or more segments long) is less than or equal to the actual MSS that the proxy can receive.

BRIEF DESCRIPTION OF THE DRAWING

FIG. 1 is a block diagram of a network that includes a proxy redirector that transparently sends requests from a client to a proxy cache by changing the destination address of packets in a client request from that of the origin server to that of a proxy and the source address from that of the client to that of the switching entity and, in accordance with the present invention, modifies a GET request to include the destination address of the origin server;

FIGS. 3, 4, 5 and 6 are flow charts detailing the operation of the proxy redirector.

DETAILED DESCRIPTION

Figure 2:
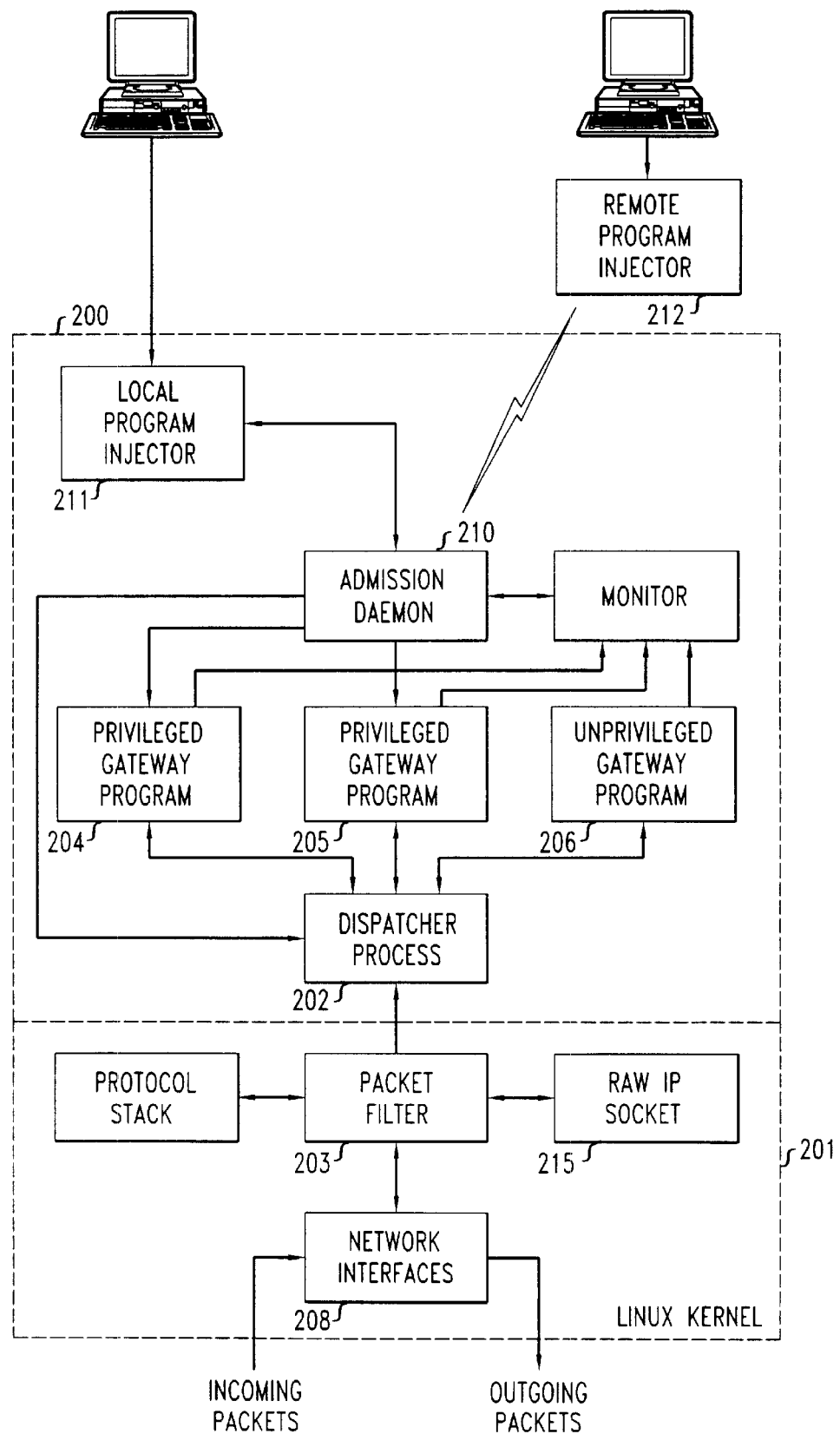
FIG. 2 is a block diagram showing the proxy redirector implemented on a programmable network element that manipulates packets in accordance with instructions provided by a loaded program.

With reference to FIG. 1, a plurality of clients 101-1–101-N are connected to a local area network (LAN) 102, such as an Ethernet. LAN 102, which, in turn, is connected through a router 103 to a Level 4 (L4) switch 104 (proxy redirector) which interfaces the LAN with a wide area network (WAN) 105, such as the Internet. Although shown as two separate elements, the functionalities of router 103 and proxy redirector 104 can in actual practice be combined in a single unit. All requests from any of the clients connected to LAN 102 for objects stored in servers connected to the Internet 105 traverse proxy redirector 104 onto the Internet. The packets comprising such requests, which include the standardized packets that establish a TCP connection, are directed to an IP destination address and port number indicated in the IP header of each packet originating from a client source address that includes a client IP address and port number. Similarly, responses to such requests from an origin server connected to Internet 105 are directed via an IP destination address that is equal to the client's IP address and port number from which the request originated, and have as a source address the server's IP address and port number. All such packets directed to any of the clients 101-1–101-N from any server connected to Internet 105 pass through proxy redirector 104.

When any of the clients connected to LAN 102, such as client 101-1, makes a request through a browser for an object by specifying a logical URL, a domain name server (DNS) 106 connected locally or on Internet 105, as shown, is accessed to perform a database look-up based on that logical name. An associated IP address is then returned to the browser. The IP address returned to the browser is the IP address of a particular origin server which contains the object requested through the logical URL. Since a logical name may in fact be associated with a plurality of essentially equivalent origin servers, such as servers 107 and 109, the particular IP address returned to the client browser chosen by DNS 106 may be determined in a round-robin manner. When DNS 106 selects an origin server corresponding to the logical URL, the IP address of the selected origin server, such as, for example, the IP address of origin server 107, is returned to the browser in the requesting client 101-1. That IP address then serves as the IP address to which packets directed to the origin server from the client are directed. Conventionally, http requests are usually directed to port 80 of an origin server.

With the IP address of the origin server determined and returned to the client, the browser establishes a TCP connection between the client and the origin server through a three-way handshaking process. Specifically, a SYN packet, addressed to the IP address of the selected origin server, is sent by the client. Handshaking is completed when the client receives an acknowledgement of receipt of that SYN packet through an ACK SYN packet sent by that origin server, and responds with a ACK packet to the origin server. The browser then sends a GET request that specifies the particular requested object.

In accordance with the present invention, once the IP address of the origin server corresponding to the logical URL name is determined through the DNS look-up, proxy redirector 104, rather than establishing a TCP connection to the origin server at the determined IP address, transparently establishes a TCP connection between the client and a proxy. If the requested object is stored in the cache, a copy of that object is transparently returned to the requesting client. A TCP connection, therefore, is not established over the Internet 105, to the actual origin server 107 to provide the requested object to the requesting client. The coss of transmitting the request to the origin server over the Internet and transmitting the copy of the requested object back over the Internet are thereby saved in addition to the time required for transmitting such a request over the Internet and waiting for a response from the origin server. If the proxy cache to which the request is directed does not contain the requested object, a separate TCP connection is established between the proxy cache and the origin server to obtain a copy of the requested object. When the proxy cache then receives the copy of the requested object from an origin server over that separate TCP connection, the copy is forwarded to the client over the original TCP connection that was established between the client and the proxy cache.

In the embodiment shown in FIG. 1, a proxy cache 110-1 is illustratively shown connected to a LAN 111, which is connected to LAN 102 through a router 112. Another proxy cache 115 is shown connected on a different LAN 116 through router 103. Other proxy caches can be located anywhere on LANs 102, 111, or 116, on another LAN connected to the Internet 105 such as proxy cache 117. Proxy redirector 104 selects one of the available proxy caches to which to forward client requests based on a metric such as least-loaded or round-robin, based on IP header information such as the origin server IP address. With respect to the latter, all objects from a specific origin server will be served by a specific proxy.

In the preferred embodiment described herein, proxy redirector 104 includes a programmable network element of the type described in co-pending U.S. patent application Ser. No. 09/190,355, filed Nov. 12, 1998, which application is incorporated herein by reference. As described in that application, that programmable network element in the preferred embodiment runs on a Linux machine. As shown in FIG. 2, the programmable network element 200 includes a dispatcher process 202 with which plural different gateway programs (204, 205 and 206) register and request access to IP packets that fit specific descriptions. Such programs are loaded through an admission daemon 210 via a local program injector 211 or a remote program injector 212. A gateway program, for example, can request access to incoming packets to network interface 208 that match certain source and destination IP address ranges and port numbers. The dispatcher process 202 uses a packet filter 203 in the Linux kernel 201 to obtain packets requested by the gateway programs and uses a raw IP socket 215 to send packets that have been manipulated in accordance with the gateway program back to the kernel for output back to the network through filter 203 through network interfaces 208. Library functions are provided in the programmable network element that enable a gateway program to communicate with the dispatcher process 202 to register rules that specify the type of IP packets that a gateway program wants diverted to it. A gateway program can request either a complete IP packet or only the IP and TCP header of a packet and can change both the header and payload of a packet.

In the present invention, that programmable network element is operative in combination with a gateway program that manipulates the destination and source addresses of packets flowing there through in a manner to be described, as well as modifying, as will be described, information in the packet(s) containing the GET request that specifies the URL of the requested object. Specifically, the programmable network element in combination with the gateway program operates on packets associated with HTTP requests, which are determined from the destination port number. As previously noted, HTTP requests are conventionally addressed to port 80 of an origin server. Thus, the programmable network element/gateway program which together comprise proxy redirector 104 in this embodiment, captures through the dispatcher process of the programmable network element, packets directed to port 80 and then performs address translations on those captured packets to readdress these packets to a selected proxy. With respect to address translations, the gateway program translates the destination IP address of packets addressed to the origin server to the IP address of a selected proxy cache and translates the source IP address of such packets from that of the client to the IP address of proxy redirector 104. Further, in order for proxy redirector 104 to identify requests from plural client terminals that are directed to the same proxy, the source port number is translated to a bogus ghost port number at the proxy redirector. Thus, when proxy cache responds, the packets transmitted by the cache have a destination IP address of proxy redirector 104 at that bogus port number, which is distinctly associated with the client. The gateway program within proxy redirector 104 then translates the IP destination address of these responsive packets from the proxy to the IP address of the client and translates the bogus destination port number to the port number from which the client originated its request. Further, the gateway program translates the source IP address of such responsive packets from that of the proxy to the IP address of the origin server and the port number to the port (80) to which the client's requests were originally directed. Thus, the packets which are returned to the client from the proxy masquerade as if they had originated from the origin server to which the client "believed" its request had been sent.

By performing the above-described network address translations (NATs) and port address translations (PATs), packets from a client 101-1 are transparently directed by proxy redirector 104 to a proxy cache. Responsive packets from the proxy cache are sent to proxy redirector 104 where they are redirected to client 101-1.

In establishing a TCP connection that is directed to an origin server, client 101-1 first transmits a SYN packet, which is intercepted by proxy redirector 104. Proxy redirector 104 selects a proxy cache, such as proxy 110-1, to redirect this request and creates a connection control block (CCB) to maintain information about the connection. Selection of the particular proxy is determined, as described above, by one of several possible algorithms. The CCB is used to store the client IP address and TCP port number and the origin server IP address and TCP port number, both of which are contained in the IP header of the SYN packet, and the chosen proxy's IP address. The destination address is then changed to that of the chosen proxy and the packet is sent back to the network for redirection to its new destination address of the proxy 110-1. All subsequent packets that originate from the same client with the same TCP port number are then forwarded to the same proxy. Proxy 110-1 responds with an ACK SYN packet which is directed via its destination address to proxy redirector 110-1. Proxy redirector 104 then translates the source IP address and port number to those of the origin server and the destination IP address and port number to those of the client. When the packet arrives at the client the client believes that it is connected to the origin server. The client then responds with an ACK packet to the origin server, which is redirected by proxy redirector 104 to proxy cache 110-1, to complete the handshaking process.

After the TCP connection is established between client 101-1 and proxy cache 110-1, client 101-1 sends one or more packets containing a GET request addressed to the origin server. Such packets are thus "captured" by proxy redirector 104 and redirected to proxy cache 110-1. As previously discussed, the GET request sent by the client contains only the complete URL sent by the client browser which in itself provides insufficient information for the proxy cache to determine whether it has the requested object and, if not, to forward it to the origin serve,r which does. In accordance with the present invention, the gateway program that is operative with the programmable network element of the proxy redirector 104, captures this packet or packets and, in addition to previously described address translations, transforms the complete URL to an absolute URL by prefixing it with the IP address of the origin server obtained from the destination IP address of the packet(s) containing the GET request. Thus, Level 7 (application) information is modified to assist in level 4 routing.

In order to make the URL transformation transparent to both the client and proxy cache endpoints, changes in IP and TCP headers are also required. Since the GET request modification increases the length of the IP packet that carries the GET request, the total length field on the IP header of this packet is increased by an offset. The offset amount is recorded in the CCB. In addition, the TCP header contains sequence numbers (seq) and acknowledgement sequence numbers (ack_seq) that need to be translated. The seq in the TCP header indicates the byte number of the first byte on this packet going from the sender to the receiver over the TCP session and the ack_seq indicates the byte number of the next byte that the sender expects to receive from the receiver. For all packets after the GET packet(s) that go from the client to the proxy cache, the seq is increased by an offset equal to the lengthof(absolute URL)-lengthof(complete URL) so that the seq matches the byte number of the byte that the proxy cache expects to receive from the client. Similarly, on all packets starting with the acknowledgement to the GET packet that go from the proxy cache to the client through the proxy redirector, the ack_seq is decreased by the same offset so that the ack_seq matches the byte number of the byte that the proxy cache would expect the client to send in the next packet following the GET packet. By performing these changes in the header, the client and proxy cache endpoints remain unaware of the modification in the GET packets from the complete URL to the absolute URL.

Table 1 illustrates the URL and other header transformations performed

TABLE 1

Arriving packet:

---> beginning of packet header dump <---
---> IP header: version=4 hdr_len=5 TOS=0 pkt_len=346 id=60276
    frag_off=4000H TTL=64 protocol=6 cksum=1792H
    saddr=135.104.25.243 daddr=204.71.200.244
---> TCP header: sport=1273 dport=80 seq=2189084427 ack_seq=3266449517
    tcp_hdr_len=5 flags=ACK PSH
    res1=0H res2=0H window=31856 cksum=162H urgent=0
---> beginning of packet data dump <---
GET /a/ya/yahoomail/promo1.gif HTTP/1.0
Referer: http://www.yahoo.com/
Connection: Keep-Alive
User-Agent: Mozilla/4.05 [en] (X11; U; Linux 2.1.103 i686)
Host: us.yimg.com
Accept: image/gif, image/x-xbitmap, image/jpeg, image/pjpeg image/png
Accept-Language: en
Accept-Charset: iso-8859-1, *,utf 8
Modified to:

---> beginning of packet header dump <---
---> IP header: version=4 hdr_len=5 TOS=0 pkt_len=367 id=60276
    frag_off=4000H TTL=64 protocol=6 cksum=1792H
    saddr=135.104.25.245 daddr=135.104.25.31
---> TCP header: sport=5000 dport=7000 seq=2189084427 ack_seq=3266449517
    tcp_hdr_len=5 flags=ACK PSH
    res1=0H res2=0H window=31856 cksum=162H urgent=0
---> beginning of packet data dump <---
GET http://204.71.200.244/a/ya/yahoomail/promo1.gif HTTP/1.0
Referer: http://www.yahoo.com/
Connection: Keep-Alive
User-Agent: Mozilla/4.05 [en] (X11; U; Linux 2.1.103 i686)
Host: us.yimg.com TABLE 1-continued Accept: image/gif, image/x-xbitmap, image/jpeg, image/pjpeg image/png
Accept-Language: en
Accept-Charset: iso-8859-1, *,utf 8 on a GET packet that arrives at proxy redirector 104 from a client 101-1. The packet is destined to an origin server at a destination IP address (daddr) 204.71.200.244 (www.yahoo.com) at a destination port (dport) 80, requesting object /a/ya/yahoomail/promo1.gif. As can be noted in the modified packet, the packet is redirected to a proxy cache 110-1 at IP address 135.104.25.31 port 7000 by changing the daddr and dport header information. Also, the complete URL of the object in the GET request is modified in the translated packet by prefixing it with http://204.71.200.244 to form the absolute URL, where that prefix is obtained from the daddr header in the arriving packet. This transformation increases the length of the packet by 21 bytes so that the pkt_len field in the header is modified from 346 to 367 bytes. Further, the source port is modified to a bogus port number by changing sport to 5000.

Table 2 shows the translations performed by the proxy redirector 104 to an acknowledgment from proxy cache 110-1 to the GET request. The arriving length of the GET packet by 21 bytes, proxy redirector 104 decreases the ack_seq field by the number of bytes added, 21. Further, proxy redirector 104 translates the destination IP address and port number to those of the client 101-1, and the source IP address and port number to that of the origin server. The modified packet, when received by the client, thus appears to the client to have originated from the origin server and the ack_seq field indicates a byte number that the client would next expect to send having previously sent a packet of length 367 bytes. All packets that are subsequently sent through the proxy redirector 104 to client 101-1 from proxy cache 110-1 are similarly modified to decrement the ack_seq field by the number of bytes, 21, added to the GET packet.

Table 3 illustrates a next packet sent by client 101-1 to the origin server after the GET packet. In this packet the sequence number (seq) is equal to the modified ack_seq sent to the client, as per Table 2. The destination IP address and port number are those of the origin server and the source

TABLE 2

Arriving packet:

```
--->   beginning of packet header dump <---
--->   IP header: version=4 hdr_len=5 TOS=0 pkt_len=40 id=14559
       frag_off=4000H TTL=255 protocol=6 cksum=10eH
       saddr=135.104.25.31 daddr=135.104.25.245
--->   TCP header: sport=7000 dport=5000 seq=3266449517 ack_seq=2189084754
       tcp_hdr_len=5 flags=ACK
       res1=0H res2=0H window=8433 cksum=32H urgent=0
```
Modified to:

```
--->   beginning of packet header dump <---
--->   IP header: version=4 hdr_len=5 TOS=0 pkt_len=40 id=14559
       frag_off=4000H TTL=255 protocol=6 cksum=10eH
       saddr=204.71.200.244 daddr=135.104.25.243
--->   TCP header: sport=80 dport=1273 seq=3266449517 ack_seq=2189084733
       tcp_hdr_len=5 flags=ACK
       res1=0H res2=0H window=8433 cksum=32H urgent=0
``` packet is addressed (daddr) to the IP address of the proxy redirector at the bogus port (dport) 5000 used by the proxy redirector for this TCP connection. The source IP address (saddr) and the source port (sport) are those of the proxy cache to where the GET request was directed. The ack_seq field indicates the byte number of the first byte that is expected to be sent in the packet following the GET packet. In this example, ack_seq is equal to the sequence number (seq) 218908427 of the GET packet plus the length of the GET packet, which in this case per Table 1 is 367. Thus ack_seq of the arriving packet is 218908754. Since client 101-1 is unaware that a proxy redirector has increased the IP address and port number are those of the client. When received by proxy redirector 104, the packet is modified to change the source IP address and port number to the IP address and bogus port number of the proxy redirector. The destination address IP and port number are translated to that of proxy cache 110-1. The sequence number (seq) is increased by that same value of 21 to match the byte number that the proxy cache expects to receive based on the sequence number previously received in the GET packet and the length, 367, of the GET packet

TABLE 3

Arriving packet:

```
--->   beginning of packet header dump <---
--->   IP header: version=4 hdr_len=5 TOS=0 pkt_len=40 id=60281
       frag_off=4000H TTL=64 protocol=6 cksum=18bfH
       saddr=135.104.25.243 daddr=204.71.200.244
```

TABLE 3-continued

```
--->   TCP header: sport=1273 dport=80 seq=2189084733 ack_seq=3266450977
       tcp_hdr_len=5 flags=ACK
       res1=0H res2=0H window=31856 cksum=d3f7H urgent=0
Modified to:

--->   beginning of packet header dump <---
--->   IP header: version=4 hdr_len=5 TOS=0 pkt_len=40 id=60281
       frag_off=4000H TTL=64 protocol=6 cksum=18bfH
       saddr=135.104.25.245 daddr=135.104.25.31
--->   TCP header: sport=5000 dport=7000 seq=2189084754 ack_seq=3266450977
       tcp_hdr_len=5 flags=ACK
       res1=0H res2=0H window=31856 cksum=d3f7H urgent=0
``` received. All subsequent packets directed to the origin server from client 101-1 are similarly modified before being directed to proxy cache 110-1.

In the above-description, it has been assumed that the length of the GET request both before modification, and after the URL extension is less than the maximum TCP segment size. In fact, the length of the GET request may be longer than one TCP segment. If the length of the GET request carrying the complete URL occupies x number of TCP segment and, after it is modified to carry the absolute URL, it still also fits into that same x number of TCP segments, then the segment carrying the URL is modified and overflowing characters are pipelined from one segment to the next. Thus, the overflowing characters from a previous packet are prefixed to the start of the next packet, etc., until the last packet, which length is increased by the increased number of bytes due to the URL modification. Therefore, the packet length of only the last segment is modified to include the characters that have been shifted into that segment. The ack_seq parameter in packets from the proxy cache to the client is modified starting from the acknowledgment to the last GET packet.

If the modification of the URL to the absolute URL could cause the last TCP segment of the GET request to overflow to another segment, a new TCP segment would need to be constructed and injected by the proxy redirector. The proxy redirector would then need to have the capability to retransmit this segment if it was lost. Thus, the proxy redirector would need to have some TCP layer functionalities. In order to avoid adding higher level functionality to the proxy redirector, segment sizes are limited to less than what the proxy cache is actually capable of receiving. When the complete URL is transformed to an extended URL, the maximum increase in size is 22 bytes, equal to the maximum length of an IP address of 15 bytes plus 7 bytes from the prefix: http://. The client is deceived to send segments whose maximum size is 22 bytes less than what the protocol allows it to send. The TCP segment size sent by the client is determined by what the proxy cache, in its handshake with the client, indicates as the maximum segment size it can receive. This is indicates by the proxy cache through the maximum segment size (MSS) field in the ACK SYN packet. Accordingly, the proxy redirector 104 intercepts the ACK SYN packets and decreases the specified MSS amount by 22. For example, if the MSS specified by the proxy cache is 1460, it is modified to 1438 by the proxy redirector before being sent to the client. When the client next sends a GET request, the TCP segments are limited to 1438 bytes. In the worst case, when the client sends a GET request, 22 bytes will be added to the xth TCP segment that carries this request. The length of this xth TCP segment will still then be within the maximum length specified by the proxy cache. If the event that the proxy cache does not stipulate a maximum MSS in the ACK SYN packet, the default used by the client is 536 bytes. An MSS option is then added by the proxy redirector to inform the client that the maximum MSS expected by the other end of the TCP connection is 514 bytes.

As previously described, a NAT and PAT are performed by proxy redirector 104 on all packets addressed by client 101-1 to an origin server, and all packets addressed by proxy cache 110-1 to proxy redirector 104 for return to the client. Proxy redirector 104 thus performs a NAT and a PAT on these packets flowing in both direction. If proxy redirector 104 selects a proxy cache that is located in such a point on the network that packets from the proxy cache addressed directly to client 101-1 must pass through proxy redirector 104 due to the network configuration, then proxy redirector need only perform a half-NAT on the packets flowing through it. Specifically, if proxy redirector 104 selects a proxy cache such as proxy cache 117, all packets addressed to client 101-1 must pass through proxy redirector 104. Proxy redirector 104 thus only needs to transform the destination IP address and port number of packets from client 101-1 to the IP address and port number of proxy cache 117, while maintaining the source IP address and port number as those of client 101-1. The packets returned from proxy cache 117 will thus be addressed to the client's IP address and port number. When they pass through proxy redirector 104, they are captured and the transformation of the source IP address and port to those of the origin server are the only address changes that need to be effected.

The problems of the prior art with respect to persistent connections is obviated in accordance with the present invention. As previously noted, during a persistent connection plural GET requests can be made by a client. In the prior art, as described, each GET request can result in a connection from a proxy cache to a different origin server if the proxy cache does not have the requested objects. The ability of a server to maintain the state of a client's connection throughout the duration of the connection is compromised if each GET request results in connections to multiple servers. In accordance with the present invention, once the IP address of the origin server is determined at the initial DNS lookup, that same IP address is used by the proxy redirector as a prefix to each complete URL in every GET request issued by the client throughout the duration of the persistent connection. Thus, assuming the proxy cache does not contain any of the requested objects, the proxy cache will establish a TCP connection to the same origin server in response to each GET request generated by the client. It should be noted that if plural client GET requests are forwarded by the proxy redirector to a proxy cache within a persistent TCP connection, ack_seq parameter in packets that flow through the proxy redirector from the proxy following each GET request must reflect the cumulative changes effected by translating the complete URL to the absolute URL in each of the preceding GET requests within the same TCP connection. Similarly, in all packets received by the proxy redirector from the client directed to the origin server within a persistent TCP connection, the seq parameter must reflect cumulative changes.

Figure 4:
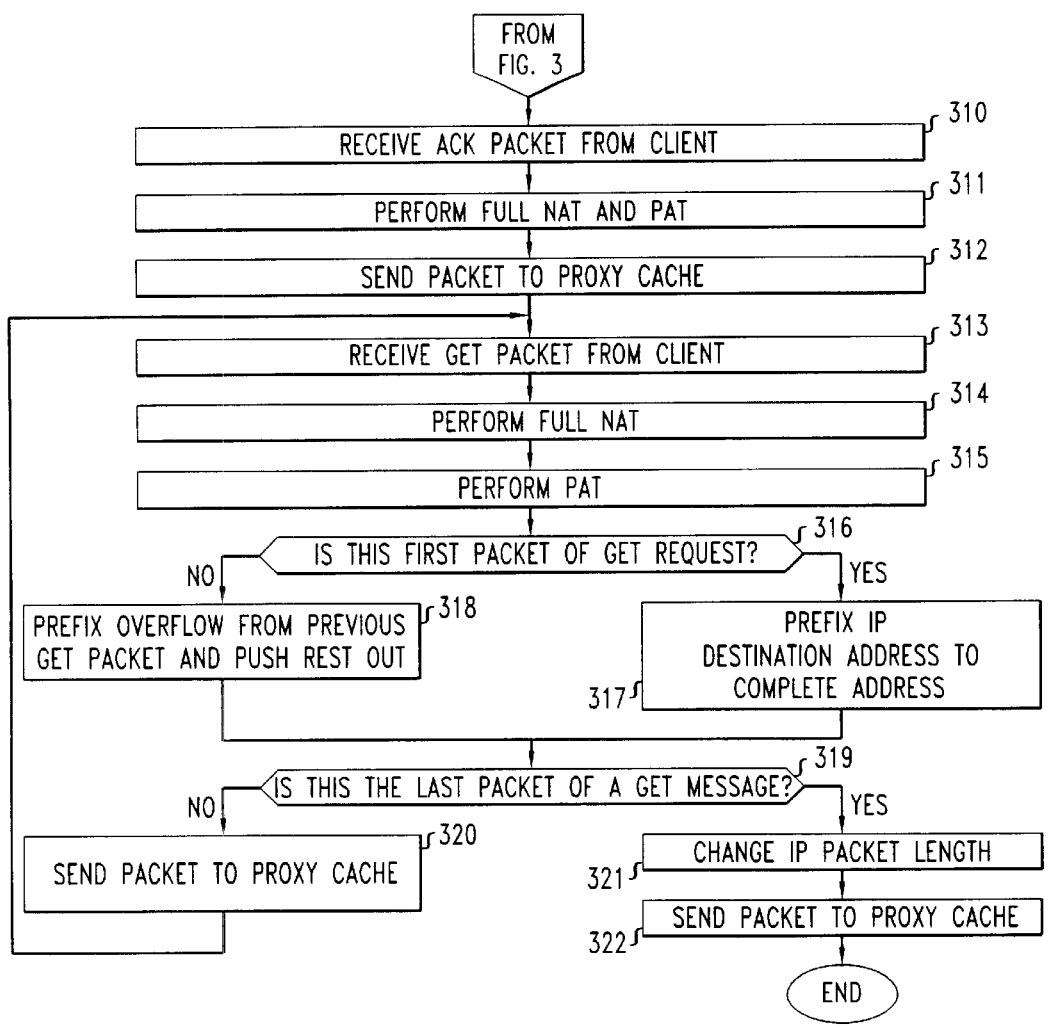

FIGS. 3, and 4, together are flow charts detailing the functions of proxy redirector 104 in establishing a TCP connection to a proxy cache and modifying the GET request so that such requests can be transparently forwarded to the proxy. At step 301, a SYN packet arrives from the client at the proxy redirector At step 302, proxy redirector selects a proxy cache based on a load balancing algorithm or on an arbitrary or random selection. At step 303, proxy redirector performs a full NAT, changing the daddr from that of the origin server to that of the selected proxy and saddr from that of the client to that of the proxy redirector. At step 304 a PAT is performed, changing sport to that of a bogus ghost port number and dport to the proxy's port number. At step 305, the SYN packet is sent to the proxy. In response to that SYN packet, the proxy responds, at step 306, with a SYN ACK packet containing an MSS parameter in the TCP header. At step 307, a reverse translation is performed on both the IP addresses and port numbers, changing saddr and sport to those of the origin server and daddr and dport to those of the client. At step 308, the MSS field is changed by reducing the value of the MSS received from the proxy by 22. At step 309, the ACK SYN packet is sent to the client. At step 310, proxy redirector receives a responsive ACK packet from the client. At step 311, a full NAT and PAT are performed on that packet and, at step 312, the modified packet is sent to the proxy, thereby completing the handshake sequence.

At step 313, a packet containing a GET request is received from the client. A full NAT is performed at step 314 and a PAT is performed at step 315. A determination is made at decision step 316 whether this is a first packet in the GET request. If yes, at step 317, the IP address of the origin server obtained Is from daddr of the arriving packet is prefixed to the complete URL in the GET request. If, at step 316, the packet is not a first packet in a GET request, then, at step 318, the overflow bytes from the previous GET packet are prefixed to those bytes in the current packet and if the total number of bytes in the resultant packet is than the actual MSS sent by the proxy, the overflow bytes greater are buffered for prefixing to the next packet. After alternative steps 316 or 318, at step 319, a determination is made whether the current packet is the last packet of a GET request. If not, at step 320, the current packet is sent to the proxy and the flow returns to step 313 to receive the next packet in the GET request from the client. If at step 319, the current packet is the last packet in a GET message, then, at step 321, the pkt_len parameter of that packet is changed to reflect the change in length of the packet. At step 322, the modified packet is sent to the proxy.

Figure 5:
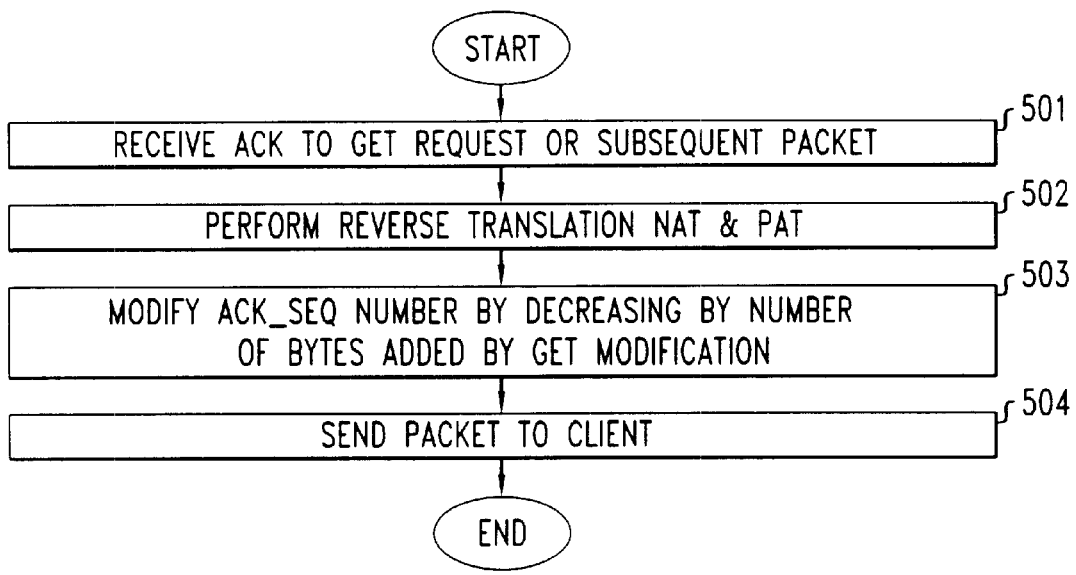

FIG. 5 illustrates the steps performed by the proxy redirector for each packet received from the proxy starting from the ACK to the GET request through the end of the connection. At step 501, the proxy redirector receives the ACK to the GET request, or any other packet that logically follows the ACK to the GET request. At step 502, reverse NAT and PATs are performed, translating daddr and dport to those of the client and saddr and sport to those of the origin server. At step 503, ack_seq is decreased by the amount added in the preceding GET request. At step 504, the modified packet is sent to the client.

Figure 6:
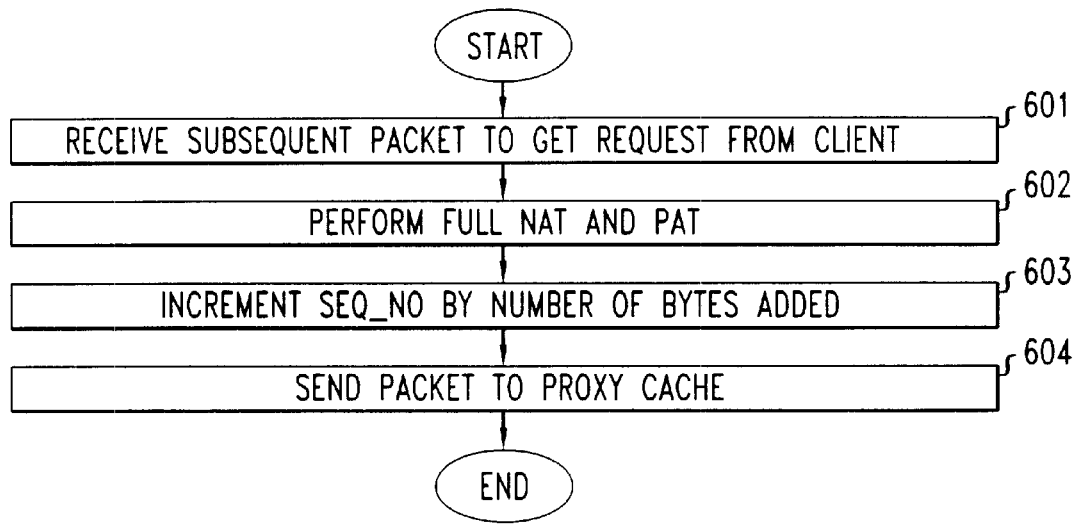

FIG. 6 illustrates the step performed by the proxy redirector for each packet destined for the origin server from the client that follows the GET request. At step 601, a packet subsequent to the GET request is received from the client. At step 602, a full NAT and PAT are performed. At step 603, seq_no is increased by the amount of bytes added by modifying the previous GET request. At step 604, the packet is sent to the proxy.

In the discussion above of FIGS. 3, 4, 5 and 6, it has been assumed that the proxy cache is located in a position such that packets directed to the client will not automatically flow through the proxy redirector. Thus, all packets from the proxy are addressed to the proxy redirector. Therefore, for packets flowing from the client, and packets flowing from the proxy, the proxy redirector performs a full NAT and PAT. If however, as previously described, the proxy cache selected by the proxy redirector is located on the network so that all packets from proxy to the client automatically flow through the proxy redirector, then, in the steps shown in FIGS. 3, 4, 5 and 6, only a half NAT needs to be performed.

Although described in conjunction the programmable network element shown in FIG. 2, the proxy redirector of the present invention could be implemented through other means, using hardware, software, or a combination of both. As an example, a level 4 switch having a fixed program to perform the required packet manipulations required by the present invention could be used.

As described, the proxy cache returns requested objects to the address from which a request originated as indicated by the saddr and sport parameters in the IP header information, which is the address of the proxy redirector 104 when the proxy cache is not connected on the network so that all responses do not automatically pass through the proxy redirector. The interactions between the requesting client and the proxy cache are transparent to both the client and the proxy cache, since the client does not "know" that its request is being redirected to the proxy by the proxy redirector, and the proxy cache, when receiving a GET request with an absolute URL does not know that that absolute URL is not being formulated by the client's browser operating in a non-transparent mode. Advantageously, the proxy cache requires no software modifications and standard proxy caches, connected anywhere on the network can be used in conjunction with the proxy redirector. If, however, the proxy is modified, using a programmable network element as previously described, for example, the requested object retrieved by the proxy from its own cache or received from an origin server, can be sent directly back to the client, thereby obviating the need to send such packets back to the proxy redirector for address translations and redirection to the client. By performing only a half-NAT at the proxy redirector and leaving the client's saddr and sport as the source IP address and port number in the header of the SYN packet, GET request packet(s), and other packets forwarded by proxy redirector 104 from the client, the proxy cache can return packets responsive to the request directly to the client by substituting the origin server's IP address and port number as the source address for its own address. If the proxy redirector performs a full NAT and PAT, then another mechanism must be incorporated to provide the client address to the proxy cache, such as incorporating the client address information as part of an appendix to the absolute address in the modified GET request and stripping the appended client address information at the proxy before determining whether the requested object is stored in the cache or whether a connection to the origin server need be made. Advantageously, by sending the packets from the proxy cache directly back to the client, the delay encountered by transmitting such packets back to the proxy redirector for address translation and redirection is eliminated. Disadvantageously, the proxy cache must be modified to perform these functions, precluding use of standard available proxy caches.

Although described hereinabove in connection with GET requests, the present invention can equally be applied to redirection of any type of request message in which the token is, for example, GET, POST or HEAD, or any other type of token yet to be implemented and/or standardized.

The foregoing therefore merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited hereinabove are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements hereinabove reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams and flowcharts described hereinabove represent conceptual views of illustrative circuitry and processes embodying the principles of the invention. Similarly, it will be appreciated that any flowcharts, flow diagrams, state transition diagrams, pseudocode, and the like represent various processes which may be substantially represented in computer readable medium and so executed by a computer or processor, whether or not such a computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent to those shown hereinabove.

What is claimed is:

1. A method at a Layer 4 switch for redirecting an HTTP connection request from a client that is directed to an origin server to a proxy cache over a packet-based computer network comprising the steps of:
   receiving at least one packet containing a request message within the HTTP connection, the at least one packet having an IP header comprising a destination address of an origin server, the request message including a complete address of a specified object at the origin server;
   modifying, at the packet level, the request message by combining the destination address of the origin server with the complete address; and
   forwarding the at least one packet containing the modified request message to the proxy cache over the packet-based network;
   wherein the proxy cache is a standard proxy cache and, in the forwarding step, the at least one packet containing the modified request is redirected to the standard proxy cache transparently from the standpoints of both the client and the proxy cache, the proxy cache being able to determine whether it can satisfy the request for the specified object by using the combined destination address of the origin server and the complete address contained in the modified request message.

2. The method of claim 1 wherein the step of modifying comprises the step of prefixing the complete address in the request message with the destination address of the origin server.

3. The method of claim 2 further comprising the step of:
   translating the destination address in an IP header of the at least one packet containing the modified request message to the address of the proxy cache.

4. The method of claim 3 further comprising the step of:
   translating a source address in the IP header of the at least one packet containing the modified request message from an address of the client to an address of the Layer 4 switch.

5. The method of claim 3 further comprising the step of:
   in a TCP header in packets received from the proxy cache commencing with an acknowledgment to the modified request message, modifying a value in an acknowledged byte sequence number field to reflect the increased number of bytes in the modified request message resulting from the step of prefixing the complete address with the destination address of the origin server.

6. The method of claim 5 wherein the step of modifying the value in the acknowledged byte sequence number field comprises the step of decreasing the value in the acknowledged byte sequence number field by the number of bytes added by prefixing the destination address of the origin server to the complete address in the request message.

7. The method of claim 6 further comprising the step of:
   translating in the IP header the destination address to the address of the client and the source address to that of the origin server in the packets received from the proxy cache commencing with the acknowledgment to the request message.

8. The method of claim 3 further comprising the step of:
modifying a value in a sent byte sequence number field to reflect the increased number of bytes in the modified request message resulting from prefixing the complete address with the destination address of the origin server in a TCP header in packets received from the client following receipt of the request message.

9. The method of claim 8 wherein the step of modifying the value in the sent byte sequence number field comprises the step of increasing the value in the sent byte sequence number field by the number of bytes added by prefixing the destination address of the origin server to the complete address in the request message.

10. The method of claim 9 further comprising the step of:
translating the destination address to the address of the proxy cache in the IP header in each packet received from the client following receipt of the request message.

11. The method of claim 2 further comprising, prior to the step of receiving the at least one packet containing the request message, the steps of:
receiving a packet from the proxy cache indicating a maximum segment size that packets sent to it thereafter should have;
reducing by a predetermined number the maximum segment size of packets to be thereafter sent to the proxy cache; and
sending a packet to the client indicating the reduced maximum segment size that packets thereafter sent by the client to the origin server should have.

12. The method of claim 11 wherein the predetermined number is equal at least to the maximum number of bytes added by the step of prefixing the destination address to the complete address in the request message.

13. The method of claim 12 further comprising the steps of:
successively shifting to a next packet in the request message overflow bites caused by the step of prefixing the destination address to the complete address in the request message, if the request message is contained within more than one packet; and
changing a length-of-packet parameter in the IP header in a last packet of a multi-packet request message to reflect the bytes shifted into the last packet from a previous packet.

14. The method of claim 12 further comprising the step of changing a length-of-packet parameter in the IP header to reflect the change in the length of that packet caused by the step of prefixing the destination address to the complete address in the request message, if the request message is contained within one packet.

15. The method of claim 1 wherein the request message is a GET request.

16. The method of claim of claim 1 further comprising the step of selecting the proxy cache from a plurality of different proxy caches prior to receiving the at least one packet containing the request message.

17. The method of claim 1 wherein the request message is a POST request.

18. The method of claim 1 wherein the request message is a HEAD request.

19. A proxy redirector for redirecting an HTTP connection request from a client that is directed to an origin server to a proxy cache over a packet-based computer network comprising:

means for receiving at least one packet containing the request message, the a least one packet having an IP header comprising a destination address of an origin server, the request message including a complete address of a specified object at the origin server;
means for modified the request message by combining the destination address of the origin server with the complete address at the packet level; and
means for forwarding the at least one packet containing the modified request message to the proxy cache over the packet-based network;
wherein the proxy cache is a standard proxy cache and the means for forwarding redirects the at least one packet containing the modified request to the standard proxy cache transparently from the standpoints of both the client and the proxy cache, the proxy cache being able to determine whether it can satisfy the request for the specified object by using the combined destination address of the origin server and the complete address contained in the modified request message.

20. The proxy redirector of claim 19 wherein the means for modifying comprises means for prefixing the complete address in the request message with the destination address of the origin server.

21. The proxy redirector of claim 20 further comprising:
means for translating the destination address in an IP header of the at least one packet containing the modified request message to the address of the proxy cache.

22. The proxy redirector of claim 21 further comprising:
means for translating a source address in the IP header of the at least one packet containing the modified request message from an address of the client to an address of the proxy redirector.

23. The proxy redirector of claim 21 further comprising:
means for modifying a value in an acknowledged byte sequence number field in a TCP header in packets received from the proxy cache, commencing with an acknowledgment to the modified request message, to reflect the increased number of bytes in the modified request message resulting from prefixing the complete address with the destination address of the origin server.

24. The proxy redirector of claim 23 wherein the means for modifying the value in the acknowledged byte sequence number field decreases the value in the acknowledged byte sequence number field by the number of bytes added by prefixing the destination address of the origin server to the complete address in the request message.

25. The proxy redirector of claim 24 further comprising:
means for translating in the IP header the destination address to the address of the client and the source address to that of the origin server in the packets received from the proxy cache commencing with the acknowledgment to the request message.

26. The proxy redirector of claim 21 further comprising:
means for modifying a value in a sent byte sequence number field to reflect the increased number of bytes in the modified request message resulting from prefixing the complete address with the destination address of the origin server in a TCP header in packets received from the client following receipt of the request message.

27. The proxy redirector of claim 26 wherein the means for modifying the value in the sent byte sequence number field increases the value in the sent byte sequence number field by the number of bytes added by prefixing the destination address of the origin server to the complete address in the request message.

28. The proxy redirector of claim 27 further comprising:
means for translating the destination address to the address of the proxy cache in the IP header each packet received from the client following receipt of the request message.

29. The proxy redirector of claim 20 further comprising:
means for receiving a packet from the proxy cache indicating a maximum segment size that packets sent to it thereafter should have;
means for reducing by a predetermined number the maximum segment size of packets to be thereafter sent to the proxy cache; and
means for sending a packet to the client indicating the reduced maximum segment size that packets thereafter sent by the client to the origin server should have.

30. The proxy redirector of claim 29 wherein the predetermined number is equal at least to the maximum number of bytes added by the prefix of the destination address to the complete address in the request message.

31. The proxy redirector of claim 30 further comprising:
means for successively shifting to a next packet in the request message overflow bytes caused by the prefix of the destination address to the complete address in the request message, if the request message is contained within more than one packet; and
means for changing a length-of-packet parameter in the IP header in a last packet of a multi-packet request message to reflect the bytes shifted into the last packet from a previous packet.

32. The proxy redirector of claim 30 wherein the proxy cache further comprises means for changing a length-of-packet parameter in the IP header to reflect the change in the length of that packet caused by the prefix of the destination address to the complete address in the request message, if the length of the request message is contained within one packet.

33. The proxy redirector of claim 19 further comprising means for selecting the proxy cache from a plurality of different proxy caches.

34. The proxy redirector of claim 19 wherein the means for modifying the request message is a gateway program dynamically loaded on a programmable network element.

35. The proxy redirector of claim 19 wherein the request message is a GET request.

36. The proxy redirector of claim 19 wherein the request message is a POST request.

37. The proxy redirector of claim 19 wherein the request message is a HEAD request.

38. A computer readable medium storing computer program instructions which are executable on a computer system implementing a Layer 4 switch for redirecting an HTTP connection request from a client to a proxy cache over a packet-based computer network, said computer program instructions comprising instructions defining the steps of:
receiving at least one packet containing the request message, the at least one packet having an IP header comprising a destination address of an origin server, the request message including a complete address of a specified object at the origin server;
modifying, at the packet level, the request message by combining the destination address of the origin server with the complete address; and
forwarding the at least one packet containing the modified request message to the proxy cache over the packet-based network;
wherein the proxy cache is a standard proxy cache and, in the forwarding step, the at least one packet containing the modified request is redirected to the standard proxy cache transparently from the standpoints of both the client and the proxy cache, the proxy cache being able to determine whether it can satisfy the request for the specified object by using the combined destination address of the origin server and the complete address contained in the modified request message.

39. The computer readable memory of claim 38 wherein the step of modifying comprises the step of prefixing the complete address in the request message with the destination address of the origin server.

40. The computer readable memory of claim 39 wherein said computer program instructions further comprise instructions defining the step of:
translating the destination address in an IP header of the at least one packet containing the modified request message to the address of the proxy cache.

41. The computer readable memory of claim 40 wherein said computer program instructions further comprise instructions defining the step of:
translating a source address in the IP header of the at least one packet containing the modified request message from an address of the client to an address of the Layer 4 switch.

42. The computer readable memory of claim 40 wherein said computer program instructions further comprise instructions defining the step of:
in a TCP header in packets received from the proxy cache commencing with an acknowledgment to the modified request message, modifying a value in a acknowledged byte sequence number field to reflect the increased number of bytes in the modified request message resulting from the step of prefixing the complete address with the destination address of the origin server.

43. The computer readable memory of claim 42 wherein the step of modifying the value in the acknowledged byte sequence number field comprises the step of decreasing the value in the acknowledged byte sequence number field by the number of bytes added by prefixing the destination address of the origin server to the complete address in the request message.

44. The computer readable memory of claim 43 wherein said computer program instructions further comprise instructions defining the step of:
translating in the IP header the destination address to the address of the client and the source address to that of the origin server in the packets received from the proxy cache commencing with the acknowledgment to the request message.

45. The computer readable memory of claim 40 wherein said computer program instructions further comprise instructions defining the step of:
modifying a value in a sent byte sequence number field to reflect the increased number of bytes in the modified request message resulting from prefixing the complete address with the destination address of the origin server in a TCP header in packets received from the client following receipt of the request message.

46. The computer readable memory of claim 45 wherein the step of modifying the value in the sent byte sequence number field comprises the step of increasing the value in the sent byte sequence number field by the number of bytes added by prefixing the destination address of the origin server to the complete address in the fequest message.

47. The computer readable memory of claim 46 wherein said computer program instructions further comprise instructions defining the step of:

translating the destination address to the address of the proxy cache in the IP header each packet received from the client following receipt of the request message.

48. The computer readable memory of claim 39 wherein said computer program instructions further comprises instructions defining, prior to the step of receiving the at least one packet containing the request message, the steps of:

receiving a packet from the proxy cache indicating a maximum segment size that packets sent to it thereafter should have;

reducing by a predetermined number the maximum segment size of packets to be thereafter sent to the proxy cache; and sending a packet to the client indicating the reduced maximum segment size that packets thereafter sent by the client to the origin server should have.

49. The computer readable memory of claim 48 wherein the predetermined number is equal at least to the maximum number of bytes added by the step of prefixing the destination address to the complete address in the request message.

50. The computer readable memory of claim 49 wherein said computer program instructions further comprise instructions defining the steps of:

successively shifting to a next packet in the request message overflow bytes caused by the step of prefixing the destination address to the complete address in the request message, if the request message is contained within more than one packet; and changing a length-of-packet parameter in the IP header in a last packet of a multi-packet request message to reflect the bytes shifted into the last packet from a previous packet.

51. The computer readable memory of claim 49 wherein said computer program instructions further comprise instructions defining the step of changing a length-of-packet parameter in the IP header to reflect the change in the length of that packet caused by the step of prefixing the destination address to the complete address in the request message, if the request message is contained within one packet.

52. The computer readable memory of claim of claim 38 wherein said computer program instructions further comprise instructions defining the step of selecting the proxy cache from a plurality of different proxy caches prior to receiving the at least one packet containing the request message.

53. The computer readable memory of claim 38 wherein the request message is a GET request.

54. The computer readable memory of claim 38 wherein the request message is a POST request.

55. The computer readable memory of claim 38 wherein the request message is a HEAD request.

\* \* \* \* \*